(12) United States Patent
Fuse et al.

(10) Patent No.: US 6,483,968 B2
(45) Date of Patent: Nov. 19, 2002

(54) SEMICONDUCTOR LIGHT EMITTING ELEMENT COUPLED WITH OPTICAL FIBER

(75) Inventors: Kazuyoshi Fuse, Yokohama; Masanobu Kimura, Kamakura; Kiyoyuki Kawai, Yokosuka; Ritsuo Yoshida, Zushi, all of (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/022,515

(22) Filed: Dec. 20, 2001

(65) Prior Publication Data

US 2002/0061169 A1 May 23, 2002

Related U.S. Application Data

(62) Division of application No. 09/542,279, filed on Apr. 4, 2000, now Pat. No. 6,345,139.

(51) Int. Cl.[7] .................................................. G02B 6/30
(52) U.S. Cl. ............................ 385/49; 385/52; 385/88; 385/43; 385/50
(58) Field of Search ............................. 385/49, 50, 52, 385/43, 88, 90, 92

(56) References Cited

U.S. PATENT DOCUMENTS

| 5,299,276 A | 3/1994 | Okamura et al. | ............. 385/49 |
|---|---|---|---|
| 6,049,646 A | 4/2000 | Boscher | ....................... 385/49 |
| 6,075,911 A | 6/2000 | Goto | ........................... 385/49 |
| 6,270,263 B1 | 8/2001 | Iwase et al. | .................. 385/49 |
| 2001/0009544 A1 | 7/2001 | Alibert | ......................... 385/52 |
| 2001/0017964 A1 | 8/2001 | Setoguchi | .................... 385/88 |

FOREIGN PATENT DOCUMENTS

JP      5-134151      5/1993

*Primary Examiner*—Cassandra Spyrou
*Assistant Examiner*—Fayez Assaf
(74) *Attorney, Agent, or Firm*—Pillsbury Winthrop LLP

(57) ABSTRACT

Even if there is a temperature variation, a positional discrepancy at a colliding surface of an active surface of a semiconductor laser and an optical waveguide is suppressed, resulting in realization of a semiconductor light emitting element coupled with optical fiber of stable operation. In order to realize the above object, a semiconductor light emitting element coupled with optical fiber comprises a substrate, an optical waveguide disposed on the substrate and including a core and a cladding layer covering the core, a semiconductor light emitting element disposed on the substrate and comprising an output end-surface facing one end of the core of the optical waveguide, and an optical fiber comprising a core an end of which faces the other end of the core of the optical waveguide, wherein the cladding layer sandwiches both surfaces of the semiconductor light emitting element.

15 Claims, 5 Drawing Sheets

SEMICONDUCTOR LIGHT EMITTING ELEMENT COUPLED WITH OPTICAL FIBER

CROSS-REFERENCE TO RELATED APPLICATION

This application is a Divisional of U.S. patent application Ser. No. 09/542,279, filed Apr. 4, 2000, now U.S. Pat. No. 6,345,159 B1 the contents of which are incorporated herein by reference.

BACKGROUND ART INFORMATION

1. Technical Field

The present invention relates to a semiconductor light emitting element coupled with optical fiber in which emission of a semiconductor element is outputted from an optical fiber.

2. Background Art

In optically coupling an edge emitting type semiconductor laser and an optical fiber for instance, optical means such as lens are used in general. The optical means such as lenses or the like can converge a diameter of a broad output beam of a semiconductor laser to a narrow one to enable to enter in the optical fiber with ease. As the result of this, a coupling loss between the semiconductor laser and the optical fiber can be suppressed.

However, in optically coupling a semiconductor laser and an optical fiber by use of optical means such as lens or the like, a plurality of lenses are required to be aligned with extremely high precision. Accordingly, an alignment takes a long time to result in increasing manufacturing costs.

As the means for annulling complication of the alignment, a method in which an emitting element and a light-propagating medium are directly coupled is disclosed in Japanese-Patent Laid-open Publication No. HEI 5-134151. According to the above, a semiconductor laser and an optical waveguide are directly coupled to make unnecessary the complicated alignment, resulting in cost reduction.

In the disclosure of the aforementioned reference, however, the semiconductor laser and the optical waveguide are disposed in an intimate contact with each other on the same substrate. As the result of this, the optical waveguide dilates due to the heat of the semiconductor laser to cause the semiconductor laser and the optical waveguide to become off-axis, resulting in the likelihood of lowering light output.

Thus, in the existing semiconductor light emitting element coupled with optical fiber, temperature variation may cause a fluctuation of light output. In the case of a semiconductor laser of high output power being broad in an active layer in particular, close attention must be paid on the fluctuation of the light output.

SUMMARY OF THE INVENTION

The object of the present invention is to provide an semiconductor light emitting element coupled with optical fiber of which variation of light output is small even if there is a temperature variation and that operates with stability.

In order to achieve the above object, the present semiconductor light emitting element coupled with optical fiber is constituted in the following ways.

(1) A semiconductor light emitting element coupled with optical fiber comprises a substrate, an optical waveguide, a semiconductor light emitting element, and an optical fiber possessing a core of which end faces the other end of the core of the optical waveguide. The optical waveguide is disposed on the substrate and includes a core and a cladding layer covering the core. The semiconductor light emitting element is disposed on the substrate and possesses an outputting end-surface facing one end of a core of the optical waveguide. Here, the cladding layer sandwiches both side surfaces of the semiconductor light emitting element.

The cladding layer of the optical waveguide sandwiches both side-surfaces of the semiconductor light emitting element, thereby the semiconductor light emitting element being directly coupled to the optical waveguide. The semiconductor light emitting element being disposed on the substrate, in the neighborhood of an optical coupling (one end of the core of the optical waveguide) of the semiconductor light emitting element and the optical waveguide, the optical waveguide is not necessary to be solidly fixed onto the substrate. Accordingly, in the neighborhood of the optical coupling of the semiconductor light emitting element and the optical waveguide, between the optical waveguide and the substrate a gap can be formed.

As a result of this, even in the case where the optical waveguide is heated due to emission from the semiconductor light emitting element to result in dilation, in the neighborhood of the optical coupling with the semiconductor light emitting element, the optical waveguide is not pressed down on the substrate.

Accordingly, due to thermal expansion of the optical waveguide relative position between an output terminal of the semiconductor light emitting element and a core of the optical waveguide shifts less.

Further, the semiconductor light emitting element and the cladding layer of the optical waveguide being unnecessary to be connected, due to the dilation of the optical waveguide an optical coupling state fluctuates less.

As mentioned above, in the semiconductor light emitting element coupled with optical fiber involving the present invention, the temperature variation in the optical waveguide does not disturb a stable light output.

(2) A semiconductor light emitting element coupled with optical fiber comprises a substrate, an optical waveguide, a semiconductor light emitting element, and an optical fiber possessing a core of which end faces the other end of the core of the optical waveguide. The optical waveguide is disposed on the substrate and includes a core and a cladding layer covering the core. The semiconductor light emitting element is mounted on a base disposed on the substrate and possesses an output end-surface facing one end of a core of the optical waveguide. Here, the cladding layer sandwiches both side surfaces of the semiconductor light emitting element or the base.

The cladding layer of the optical waveguide sandwiches both side-surfaces of the semiconductor light emitting element or the base thereon the semiconductor light emitting element is mounted. Thereby, the semiconductor light emitting element and the optical waveguide are indirectly coupled. Accordingly, similarly with the case (1), a gap can be formed between the optical waveguide and the substrate, and the semiconductor light emitting element and the cladding layer of the optical waveguide are not required to adhere.

As a result of this, similarly with the case (1), in the semiconductor light emitting element coupled with optical fiber involving the present invention, the temperature variation does not disturb stable light output.

(3) A semiconductor light emitting element coupled with optical fiber comprises a substrate, an optical waveguide, a semiconductor light emitting element, and an optical fiber possessing a core of which an end faces the other end of the core of the optical waveguide. The optical waveguide is disposed on the substrate and includes a core and a cladding layer covering the core. The semiconductor light emitting element is mounted on a base disposed on the substrate and possesses an output end-surface facing one end of a core of the optical waveguide. Here, the cladding layer of the optical waveguide is solidly fixed on an upper surface of the base.

The cladding layer of the optical waveguide is solidly fixed on an upper surface of the base thereon the semiconductor light emitting element is mounted. Thereby, the semiconductor light emitting element and the optical waveguide are indirectly coupled. Accordingly, similarly with the case (1), a gap can be formed between the optical waveguide and the substrate, and the semiconductor light emitting element and the cladding layer of the optical waveguide are not required to adhere.

As a result of this, similarly with the case (1), in the semiconductor light emitting element coupled with optical fiber involving the present invention, even the temperature variation does not disturb stable light output.

(4) A semiconductor light emitting element coupled with optical fiber comprises a substrate, an optical waveguide, a semiconductor light emitting element, and an optical fiber possessing a core of which end faces the other end of the core of the optical waveguide. The optical waveguide is disposed on the substrate and includes a core and a cladding layer covering the core. The semiconductor light emitting element is disposed on the substrate and possesses an output end-surface facing one end of a core of the optical waveguide. Here, the cladding layer of the optical waveguide is solidly fixed on an end-surface of a side that does not face the optical waveguide of the semiconductor light emitting element.

The cladding layer of the optical waveguide is solidly fixed to the semiconductor light emitting element, thereby the semiconductor light emitting element is connected to the optical waveguide. Accordingly, similarly with the case (1), a gap can be formed between the optical waveguide and the substrate, resulting in dispensing with adherence of the cladding layer of the semiconductor light emitting element and the optical waveguide.

Accordingly, an optical coupling-state between the output end-surface of the semiconductor light emitting element and the core of the optical waveguide is not affected by the thermal expansion of the optical guide, to be constant. As a result of this, the temperature variation in the optical waveguide does not disturb stable light output.

(5) A semiconductor light emitting element coupled with optical fiber comprises a substrate, an optical waveguide, a semiconductor light emitting element, and an optical fiber possessing a core of which end faces the other end of the core of the optical waveguide. The optical waveguide is disposed on the substrate and includes a core and a cladding layer covering the core. The semiconductor light emitting element is mounted on a base disposed on the substrate and possesses an output end-surface facing one end of a core of the optical waveguide. Here, the cladding layer of the optical waveguide is solidly fixed to an end-surface of a side thereto the optical waveguide of the base does not face.

Accordingly, a gap can be formed between the optical waveguide the substrate, thereby the semiconductor light emitting element and the cladding layer of the optical waveguide being unnecessary to adhere.

Accordingly, similarly with the case (4), the temperature variation of the optical waveguide does not disturb stable light output.

(6) A semiconductor light emitting element coupled with optical fiber comprises a substrate, an optical waveguide, a semiconductor light emitting element, and an optical fiber possessing a core of which end faces the other end of a core of the optical waveguide. The optical waveguide is disposed on the substrate and includes the core and a cladding layer covering the core. The semiconductor light emitting element is disposed on the substrate and possesses an output end-surface facing one end of the core of the optical waveguide. Here, the optical waveguide is solidly fixed to the substrate in the neighborhood of the other end of the core and possesses a gap between the substrate in the neighborhood of one end of the core.

The existence of the gap, between the semiconductor light emitting element and the optical waveguide, decreases a shift of a relative position due to thermal expansion of the optical waveguide. Accordingly, the temperature variation in the optical waveguide does not disturb stable light output.

DESCRIPTION OF PREFERRED EMBODIMENTS

In the following, detailed explanation of embodiments of the present invention will be given with reference to the drawings.

(First Embodiment)

Figure 1A:
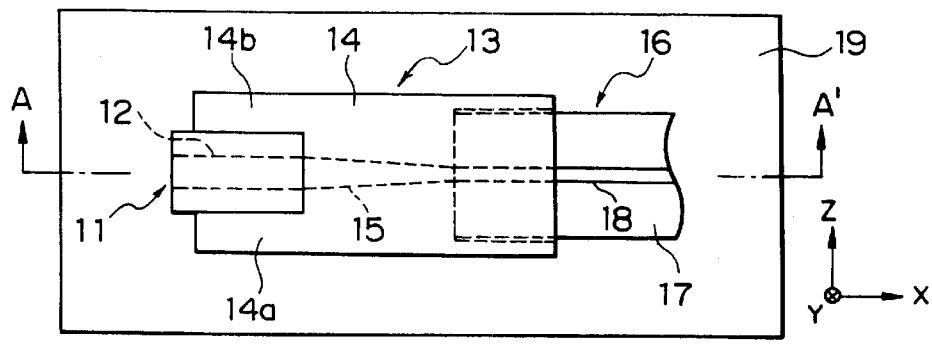
FIG. 1A and FIG. 1B are diagrams of fundamental configuration showing a first embodiment of the present invention, FIG. 1A being a plan view and FIG. 1B being a sectional side view.
Figure 1B:
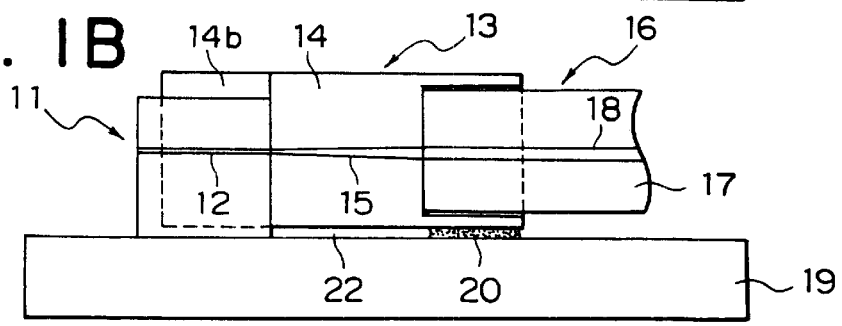
Figure 2:
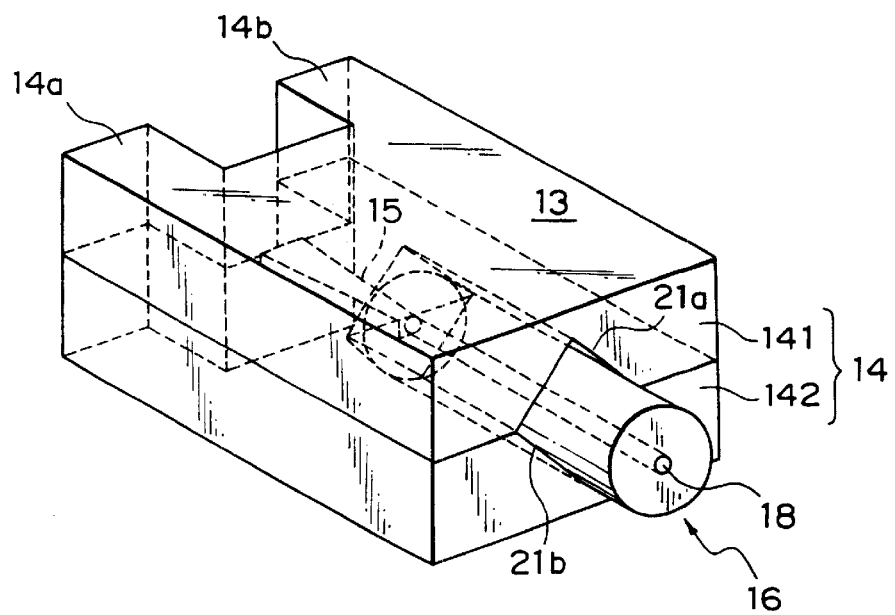
FIG. 2 is a perspective view showing a state seen from an optical fiber side of an optical waveguide of FIG. 1.
Figure 3:
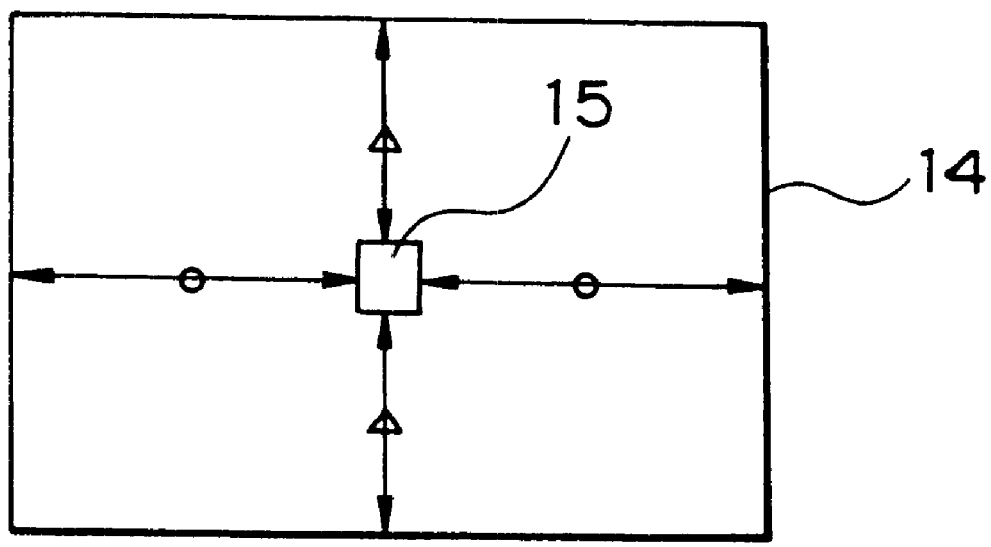
FIG. 3 is sectional view showing a section of an optical waveguide in FIG. 1.

In from FIG. 1 to FIG. 3, a first embodiment of a semiconductor light emitting element coupled with optical fiber involving the present invention is shown. FIG. 1A is a plan view, FIG. 1B being a sectional side view showing a side cross-section along a line A–A' of FIG. 1A. FIG. 2 is a perspective view showing a substantial portion of the semiconductor light emitting element coupled with optical fiber shown in FIG. 1. FIG. 3 is a sectional view showing a cross-section of an optical waveguide.

In the axes of coordinates shown in FIG. 1A, a propagating direction of laser light is X-axis, a direction perpendicular to a plane of paper Y-axis, and an axis orthogonal to these directions Z-axis. Constituents of electric circuitry such as wiring and terminals for power supply are omitted in the figures.

On a substrate 19, a semiconductor laser 11 and an optical waveguide 13 are disposed, one end of an optical fiber 16 being inserted into the inside of the optical waveguide 13. An end-surface of an active layer 12 in the semiconductor laser 11 faces an end of a core 15 of the optical waveguide 13, the other end of the core 15 of the optical waveguide 13 being opposite to an end of a core 18 of the optical fiber 16.

Laser light is emitted from an end-surface of the active layer 12 of the semiconductor laser 11. The laser light emitted from the active layer 12 is propagated to the core 18 of the optical fiber 16 after repeating total reflections at a boundary surface of the core 15 and a cladding layer 14. Thus, the laser light of the semiconductor laser 11 is lead to the core 18 of the optical fiber 16 through the core 15 of the optical waveguide 13.

The semiconductor laser 11 constitutes a semiconductor light emitting element in the present embodiment. In the present embodiment, the semiconductor laser 11 is a so-called edge emitting type semiconductor laser.

The optical waveguide 13, as shown in a perspective view of FIG. 2 seen from the optical fiber 16 side, is constituted by surrounding a circumference of the core 15 by the cladding layer 14 of a refractive index lower than the core. The cladding layer 14 is constituted of upper and lower cladding layers 141 and 142. On the optical fiber 16 side, v-grooves 21a and 21b are formed on the upper and lower cladding layers 141 and 142. In the semiconductor laser 11 side, the cladding layer 14 forms arms 14a and 14b.

As materials for the cladding layer 14 and the core 15, glass and resin such as acrylic resin or polycarbonate can be used. On the other hand, in order to facilitate absorption of expansion and contraction due to temperature variations of a system constituting the device, silicone based resin may be used.

In general, when a width of the active layer 12 therefrom the laser light is emitted is narrow in a direction of Z-axis, the semiconductor laser 11 and the optical fiber 16 are optically coupled by means of optical system such as lenses or the like. The optical system such as the lens or the like converges the laser light emitted from the active layer 12 and leads to the core 18 of the optical fiber 16. However, when the laser light of high output power is desired, the width of the active layer 12 becomes inevitably broader. Accordingly, it is difficult for the laser light emitted from the active layer 12 to be efficiently inputted into the core 18 of the optical fiber 16 of which cross section is ordinarily circular by means of the optical system such as the lens or the like. As the result of this, in the present embodiment, the semiconductor laser 11 and the optical fiber 16 are optically coupled by use of the optical waveguide 13.

Here, the shape of the cross-section of the optical waveguide 13 is symmetrical with the core 15 as a center. That is, when the cross section is a rectangle, as shown in FIG. 3, thicknesses of Y-axis and Z-axis directions that sandwich the core are made equal, respectively. Naturally, when the cross section is a circle, the center of the core is the center of the circle.

Implementing thus, the expansion of the optical waveguide 13 due to heat generation of the semiconductor laser 11 becomes symmetrical with the core 15 as the center. Accordingly, positional shift between the active layer 12 and the core 15 can be suppressed smaller.

The configuration of FIG. 3 can be similarly applied to all the following embodiments.

The optical fiber 16 is surrounded a circumference of the core 18 by the cladding layer 17 of refractive index lower than that of the core 18 to constitute.

In the following, state of connections of the respective constituents will be explained in detail.

The semiconductor laser 11 is sandwiched by arms 14a and 14b extended on side surfaces thereof to fix to the optical waveguide 13. In fixing, the semiconductor laser 11 is adhered to side surfaces of the arms 14a and 14b in the vicinity of the active layer 12. Here, the semiconductor laser 11 is adhered to the arms 14a and 14b with the core 15 of the optical waveguide 13 pressed onto the active layer 12 of the semiconductor laser 11. Accordingly, the optical waveguide 13 and the semiconductor laser 11 are solidly fixed with pressure exerted therebetween.

As a result of this, the active layer 12 of the semiconductor laser 11 faces the core 15 of the optical waveguide 13, the semiconductor laser 11 and the optical waveguide 13 being optically coupled.

At an end-surface of the semiconductor laser 11 side of the optical waveguide 13, the core 15 is projected from the cladding layer 14, the core 15 and the active layer 12 being heightened in intimacy of contact. Thereby, efficient optical coupling between the core 15 and the active layer 12 can be implemented.

The optical fiber 16 is sandwiched by the V-grooves 21a and 21b of the optical waveguide 13 to fix. As a result of this, the core 15 of the optical waveguide 13 and the core 18 of the optical fiber 16 are disposed to face end-surfaces thereof to each other, the optical waveguide 13 and the optical fiber 16 being optically coupled.

In the neighborhood where the optical waveguide 13 and the optical fiber 16 are solidly fixed, a bottom surface of the optical waveguide 13 and the substrate 19 are adhered by means of an adherent 20. As the result of this, as shown in FIG. 1B, between the optical waveguide 13 (in the neighborhood of the connection with semiconductor laser 11 in particular) and the substrate 19, a gap 22 corresponding to a thickness of a layer of the adherent 20 is disposed.

Due to the existence of the gap 22, even if the optical waveguide 13 is dilated due to the heat generation of the semiconductor laser 11, the optical waveguide 13 does not push the substrate 19. As the result of this, the active layer 12 of the semiconductor laser 11 and the core 15 are not shifted relative to each other due to the dilation of the optical waveguide 13.

As mentioned above, in the present embodiment, the optical waveguide is prevented from expanding due to the heat generation to push the substrate to result in the relative shifting between the active layer and the core. Accordingly, the laser light can be propagated with stability.

(Second Embodiment)

A second embodiment of a semiconductor light emitting element coupled with optical fiber involving the present invention will be explained.

Figure 4:
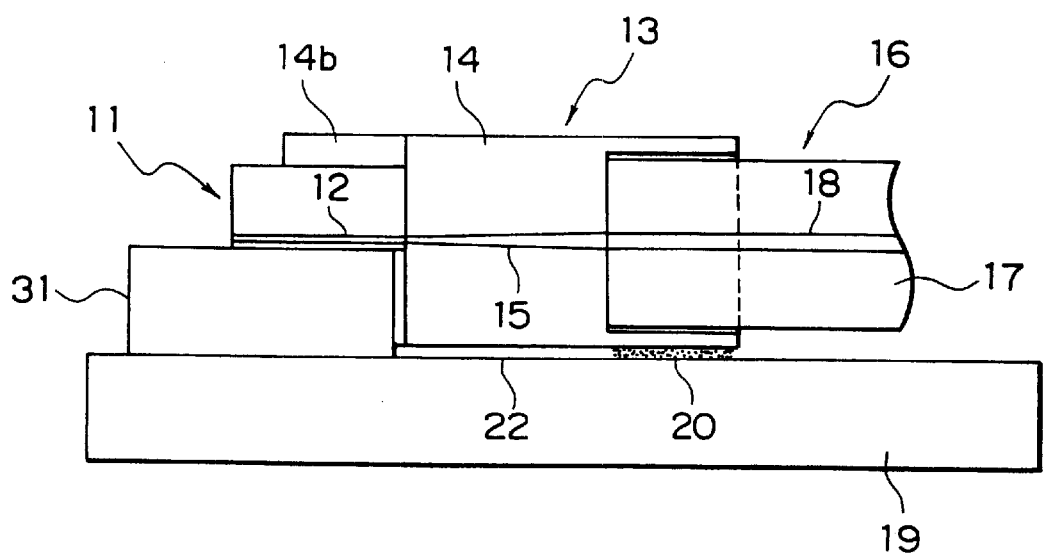
FIG. 4 is a sectional side view showing a second embodiment of the present invention.
Figure 5:
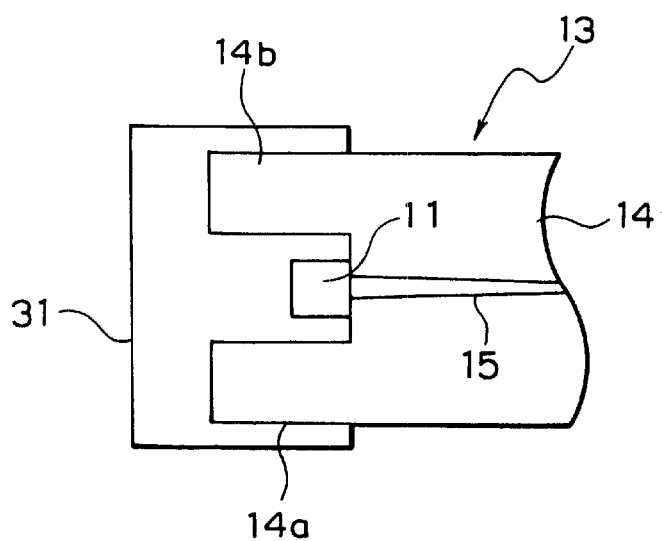
FIG. 5 is a partial plan view showing a modification example of a second embodiment of the present invention.

FIG. 4 is a sectional side view showing the present second embodiment, corresponding to FIG. 1B. FIG. 5 is a plan view showing part of a semiconductor light emitting element coupled with optical fiber involving the present embodiment. The same constituents with FIG. 1 are given the same reference numerals.

As shown in FIG. 4, the semiconductor laser 11 is attached to the substrate 19 through a base 31. On the substrate 19, the base 31 of a prescribed height of aluminum nitride that is excellent in thermal conduction is disposed. Further, on the base 31, the-semiconductor laser 11 is disposed so that the active layer 12 is located at an approximately equal height with the core 18 of the optical fiber 16.

The semiconductor laser 11, as approximately identical with FIG. 1B, is fixed to the optical waveguide 13 in the following way. That is, the semiconductor laser 11 or the base 31 are adhered to side surfaces of the arms 14a and 14b in the vicinity of the active layer 12. Here, the semiconductor laser 11 or the base 31 are adhered to the arms 14a and 14b with the core 15 of the optical waveguide 13 pressed onto the active layer of the semiconductor laser 11. Accordingly, the optical waveguide 13 and the semiconductor laser 11 are solidly fixed with pressure exerted therebetween.

As explained in FIG. 1, the optical waveguide 13 is adhered to the substrate 19 only in the neighborhood of the optical fiber 16. As the result of this, between the optical waveguide 13 (vicinity of connection with the semiconductor laser 11 in particular) and the substrate 19, the gap 22 corresponding to a thickness of a layer of the adherent 20 is disposed.

The present embodiment is effective when an active layer of a semiconductor laser is located close to a substrate thereto a semiconductor laser is solidly fixed, and the semiconductor laser 11, the optical waveguide 13 and the optical fiber 16 are connected with difficulty on the same planar substrate 19.

The plan view of FIG. 5, as a modification example of the second embodiment, shows the case where an upper surface of the base 31 is sufficiently larger than the semiconductor laser 11. In this case, the arms 14a and 14b are removed of portions corresponding to the lower side cladding layer 142 shown in FIG. 2, being fixed on the base 31 at a portion corresponding to the upper side cladding layer 141.

(Third Embodiment)

A third embodiment of a semiconductor light emitting element coupled with optical fiber involving the present invention will be explained.

Figure 6:
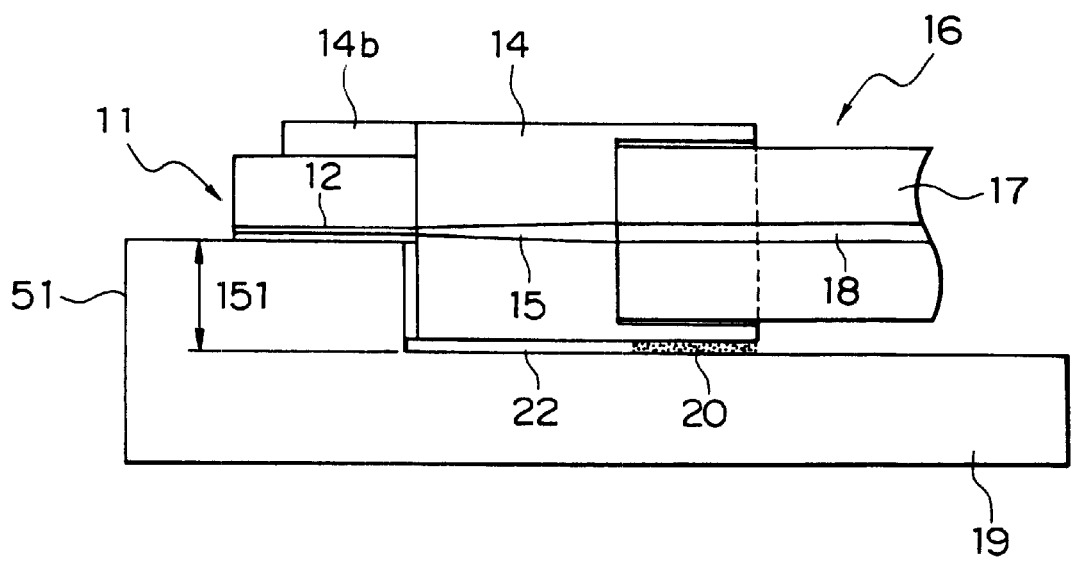
FIG. 6 is a sectional side view showing a third embodiment of the present invention.
Figure 7:
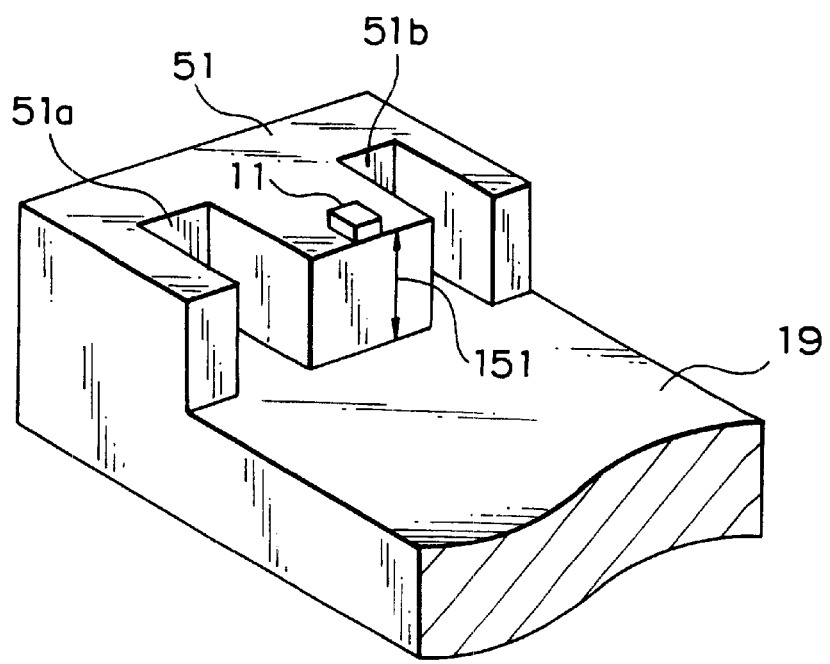
FIG. 7 is a perspective view showing a shape of a substrate in FIG. 6.

FIGS. 6 and 7 are a sectional side view and a perspective view showing a third embodiment of the present invention. Here, FIG. 6 corresponds to FIG. 1B. The same constituents with FIG. 1 are given the same reference numerals.

As shown in FIGS. 6 and 7, the semiconductor laser 11 is attached to the substrate 19. On the substrate 19, a step portion 51 corresponding to a height of the base 31 in FIG. 4 is formed integrally with the substrate 19. The semiconductor laser 11 is disposed on the step portion 51. As the result of this, the active layer 12 and the core 18 of the optical fiber 16 are disposed at an approximately-same height.

In a step 151 due to the step portion 51 thereon the semiconductor laser 11 is mounted, as shown in FIG. 7, on both sides of the semiconductor laser 11, concave portions 51a and 51b are formed. These concave portions 51a and 51b are formed in the sizes corresponding to the arms 14a and 14b of the cladding layer 14. As the result of this, the arms 14a and 14b can enter into the concave portions 51a and 51b. Thereby, the step portion 51 thereon the semiconductor laser 11 is mounted, as identical with FIGS. 1 and 4 can be sandwiched.

In the present embodiment, without forming the concave portions 51a and 51b, a height of the semiconductor laser 11 can be adjusted. For instance, as in FIG. 5, with the arms 14a and 14b removed of the portions corresponding to the lower side cladding layer 142, the portions corresponding to the upper side cladding layers 141 can be fixed on the step portion 51.

(Fourth Embodiment)

A fourth embodiment of an semiconductor light emitting element coupled with optical fiber involving the present invention will be explained.

Figure 8:
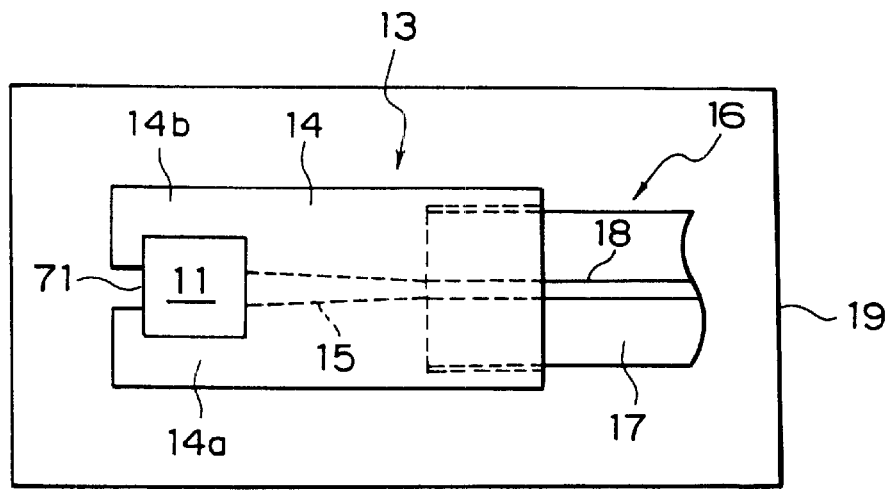
FIG. 8 is a plan view showing a fourth embodiment of the present invention.

FIG. 8 is a plan view showing a fourth embodiment of the present invention, corresponding to FIG. 1A. The same constituents with FIG. 1 are given the same reference numerals.

As shown in FIG. 8, the semiconductor laser 11 is attached to the substrate 19. The arms 14a and 14b of the cladding layer 14 go around from side surfaces of the semiconductor laser 11 up to a rear surface 71 opposite to a surface where the semiconductor laser 11 contacts the core 15. The arms 14a and 14b are adhered to the rear surface 71 to connect the semiconductor laser 11 and the optical waveguide 13.

When the optical waveguide 13 is expanded due to heat generation of the semiconductor laser 11, the arms 14a and 14b also expand. Accordingly, between the core 15 and the semiconductor laser 11, force exerts to divert from each other.

However, the semiconductor laser 11 and the optical waveguide 13 being solidly fixed on the substrate 19 respectively (the optical waveguide 13 being solidly fixed on the substrate 19 in the neighborhood of the optical coupling between the optical waveguide 13 and the optical fiber 16), the semiconductor laser 11 and the core 15 do not separate from each other.

As the result of this, an optical coupling state of colliding surfaces of the active layer 12 and the core 15 is not affected adversely by the heat generation of the semiconductor laser 11, resulting in a stable light output.

As shown in the above, FIG. 8 shows an embodiment where the arms 14a and 14b of the cladding layer 14 and the rear surface 71 of the semiconductor laser 11 are directly fixed. However, the arms 14a and 14b of the cladding layer 14 and the rear surface 71 of the semiconductor laser 11 can be indirectly fixed. For instance, as in the second embodiment, the semiconductor laser 11 is mounted on the base for height adjustment. Thereafter, a rear surface of the base on a side that does not contact the core 15 and side portions of the arms 14a and 14b of the cladding layer 14 can be adhered.

(Fifth Embodiment)

In the aforementioned embodiments 1 to 4, with the adherent 20, the gap 22 is formed between the optical waveguide 13 and the substrate 19. The gap 22 is formed in the neighborhood of the connection between the core 15 and the semiconductor laser 11, a thickness thereof being corresponding to a thickness of the adherent 20.

By contrast, a constitution that forms the gap 22 without necessarily depending on the thickness of the layer of the adherent 20 is shown as a fifth embodiment.

Figure 9:
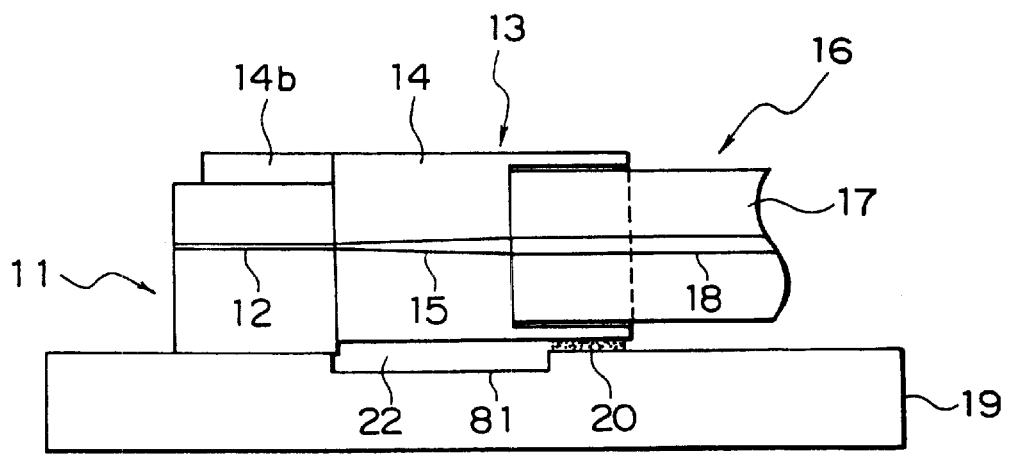
FIG. 9 is a sectional side view showing a fifth embodiment of the present invention.

FIG. 9 is a sectional side view of an semiconductor light emitting element coupled with optical fiber involving a fifth embodiment of the present invention.

As shown in this figure, on the substrate 19 of a portion that demands a gap, a concave portion 81 is formed so that a step is formed from a side opposite to the optical fiber of the optical waveguide 13. By means of the concave portion 81, the gap 22 is formed in the vicinity of the connection between the core 15 and the semiconductor laser 11.

In the present embodiment, compared with the case where the adherent 20 forms the gap 22, a depth of the concave portion 81 can be arbitrarily set with ease. As the result of this, a necessary amount of the gap 22 can be obtained with ease. That is, the present embodiment, even if the desired gap is difficult to obtain by means of a layer of adherent, can be applied with ease.

FIG. 9 shows in a sense a modification example of a first embodiment. The formation of the concave portion 81 of the present embodiment is of course similarly applicable to the second to fourth embodiments.

(Other Embodiment)

The present invention is not restricted to the aforementioned embodiments. The embodiment of the present invention can be expanded and modified within the range of technical thought of the present invention, the expanded and modified embodiments also being included in the technical range of the present invention.

(1). For instance, as a semiconductor light emitting element, though a edge emitting type being used in the above, a surface light emitting type can be similarly effective.

(2). The adherent 20, to form the gap 22 into an appropriate height, can be mixed with for instance fine spherical glass beads. Adjustment of a diameter of the glass beads being mixed with allows controlling a height of the gap 22.

Other than the fifth embodiment, without depending on the layer of the adherent 20, the gap 22 can be formed. For instance, a plate of an appropriate thickness can be interposed between the optical waveguide 13 and the substrate 19 as a spacer. Thereafter, by screwing up the optical waveguide 13 and the substrate 19, the gap 22 corresponding to the thickness of the plate can be formed.

(3). The fundamental thought of the present invention is to reduce an influence of thermal expansion of the optical waveguide 13 in the vicinity of the optical coupling between the semiconductor light emitting element 11 and the optical waveguide 13. For this, in the neighborhood of the optical coupling, the gap is formed for the optical waveguide 13 and the substrate 19 not to contact.

Means for forming the gap 22, other than the means due to the adherent 20 or the concave portion 81, the heights of the semiconductor light emitting element 11 and the optical waveguide 13 can be adjusted to implement. That is, the active layer 12 of the semiconductor light emitting element 11 can be made a little higher than that of the core of the optical waveguide 13 to form the gap 22 of an appropriate thickness. The height of the active layer 12 can be adjusted with ease by, other than the semiconductor light emitting element itself, adjustment of the height of the base 31.

As obvious from the above, the thickness of the gap 22 can be determined by taking into consideration all of the adjustment of the heights of the semiconductor light emitting element 11 and the optical waveguide 13, the thickness of the layer (or spacer) of the adherent 20 and the depth of the concave portion 81.

What is claimed is:

1. A semiconductor light emitting element coupled with optical fiber, comprising:
    a substrate;
    a base disposed on the substrate;
    an optical waveguide disposed on the substrate, comprising a core having one end facing output end-surface and a cladding layer covering the core, sandwiching both side surfaces of the base;
    a semiconductor light emitting element mounted on the base, comprising an output end-surface;
    an optical fiber comprising a core an end of which faces the other end of the core of the optical waveguide.

2. The semiconductor light emitting element coupled with optical fiber as set forth in claim 1:
    wherein in the neighborhood of the one end of the core of the optical waveguide, a concave portion is formed on a surface of the substrate.

3. The semiconductor light emitting element coupled with optical fiber as set forth in claim 1:
    wherein the cladding layer is formed symmetrical with respect to a central axis of the core of the optical waveguide.

4. The semiconductor light emitting element coupled with optical fiber as set forth in claim 1:
    wherein a cross section perpendicular to the central axis of the core of the optical waveguide is rectangular; and
    wherein, when the central axis is X-axis, and axes forming the cross section Y-axis and Z-axis, distances from the central axis to each sides of the rectangle are equal in Y and Z directions, respectively.

5. The semiconductor light emitting element coupled with optical fiber as set forth in claim 1:
    wherein the core and the cladding layer of the optical waveguide are composed of resins of prescribed refractive indices.

6. A semiconductor light emitting element coupled with optical fiber, comprising:
    a substrate;
    a base disposed on the substrate;
    a semiconductor light emitting element mounted on a base, comprising an output end-surface;
    an optical waveguide disposed on the substrate, comprising a core having one end facing the output end-surface and a cladding layer covering the core, sandwiching both side surfaces of the semiconductor light emitting element;
    an optical fiber comprising a core an end of which faces the other end of the core of the optical waveguide.

7. The semiconductor light emitting element coupled with optical fiber as set forth in claim 6:
    wherein in the neighborhood of the one end of the core of the optical waveguide, a concave portion is formed on a surface of the substrate.

8. The semiconductor light emitting element coupled with optical fiber as set forth in claim 6:
    wherein the cladding layer is formed symmetrical with respect to a central axis of the core of the optical waveguide.

9. The semiconductor light emitting element coupled with optical fiber as set forth in claim 6:
    wherein a cross section perpendicular to the central axis of the core of the optical waveguide is rectangular; and
    wherein, when the central axis is X-axis, and axes forming the cross section Y-axis and Z-axis, distances from the central axis to each sides of the rectangle are equal in Y and Z directions, respectively.

10. The semiconductor light emitting element coupled with optical fiber as set forth in claim 6:
    wherein the core and the cladding layer of the optical waveguide are composed of resins of prescribed refractive indices.

11. A semiconductor light emitting element coupled with optical fiber, comprising:
    a substrate;
    a base disposed on the substrate;
    a semiconductor light emitting element mounted on a base, comprising an output end-surface;
    an optical waveguide disposed on the substrate, comprising a core having one end facing output end-surface and a cladding layer covering the core, sandwiching both side surface of the base and the semiconductor light emitting element;
    an optical fiber comprising a core an end of which faces the other end of the core of the optical waveguide.

12. The semiconductor light emitting element coupled with optical fiber as set forth in claim 11:
    wherein in the neighborhood of the one end of the core of the optical waveguide, a concave portion is formed on a surface of the substrate.

13. The semiconductor light emitting element coupled with optical fiber as set forth in claim 11:

wherein the cladding layer is formed symmetrical with respect to a central axis of the core of the optical waveguide.

14. The semiconductor light emitting element coupled with optical fiber as set forth in claim 11:

wherein a cross section perpendicular to the central axis of the core of the optical waveguide is rectangular; and wherein, when the central axis is X-axis, and axes forming the cross section Y-axis and Z-axis, distances from the central axis to each sides of the rectangle are equal in Y and Z directions, respectively.

15. The semiconductor light emitting element coupled with optical fiber as set forth in claim 11:

wherein the core and the cladding layer of the optical waveguide are composed of resins of prescribed refractive indices.

\* \* \* \* \*

UNITED STATES PATENT AND TRADEMARK OFFICE
CERTIFICATE OF CORRECTION

PATENT NO. : 6,483,968 B2
DATED : November 19, 2002
INVENTOR(S) : Kazuyoshi Fuse It is certified that error appears in the above-identified patent and that said Letters Patent is hereby corrected as shown below:

Title page,
Item [56], References Cited, U.S. PATENT DOCUMENTS, replace "2001/0009544 A1" with -- 2001/0009597 A1 --.

Column 9,
Line 48, replace "a core having one end facing output end-surface" with -- a core having one end facing an output end-surface --.

Column 10,
Line 55, replace "a core having one end facing output end-surface" with -- a core having one end facing the output end-surface --.

Signed and Sealed this

Twentieth Day of April, 2004

JON W. DUDAS
*Acting Director of the United States Patent and Trademark Office*